(12) United States Patent
Brownlie et al.

(10) Patent No.: US 7,174,563 B1
(45) Date of Patent: *Feb. 6, 2007

(54) COMPUTER NETWORK SECURITY SYSTEM AND METHOD HAVING UNILATERAL ENFORCEABLE SECURITY POLICY PROVISION

(75) Inventors: Michael Brownlie, Ottawa (CA); Stephen Hillier, Ottawa (CA); Paul C. Van Oorschot, Ottawa (CA)

(73) Assignee: Entrust, Limited, Ottawa (CA)

( * ) Notice: Subject to any disclaimer, the term of this patent is extended or adjusted under 35 U.S.C. 154(b) by 1121 days.

This patent is subject to a terminal disclaimer.

(21) Appl. No.: 09/707,285

(22) Filed: Nov. 1, 2000

Related U.S. Application Data (63) Continuation of application No. 08/986,457, filed on Dec. 8, 1997, now Pat. No. 6,202,157.

(51) Int. Cl.
G06F 17/00 (2006.01)
H04K 1/00 (2006.01)

(52) U.S. Cl. .................. 726/1; 713/151; 713/152; 713/156; 713/157; 713/158; 713/175; 713/176; 713/180; 726/10; 709/223; 709/225

(58) Field of Classification Search ............... 713/200, 713/201, 168, 156–158, 175, 176, 151, 152, 713/1; 709/200, 229, 237, 223, 225; 707/9, 707/10; 706/46, 47; 726/1, 10
See application file for complete search history.

(56) References Cited

U.S. PATENT DOCUMENTS

| | | | |
|---|---|---|---|
| 5,148,481 A | 9/1992 | Abraham et al. | |
| 5,164,988 A | 11/1992 | Matyas et al. | |
| 5,204,961 A | 4/1993 | Barlow | |
| 5,218,676 A | 6/1993 | Ben-Ayed et al. | |
| 5,265,164 A | 11/1993 | Matyas et al. | |
| 5,315,657 A | 5/1994 | Abadi et al. | |
| 5,577,209 A | 11/1996 | Boyle et al. | |
| 5,606,668 A | 2/1997 | Shwed | |
| 5,621,889 A | 4/1997 | Lermuzeaux et al. | |
| 5,699,431 A * | 12/1997 | Van Oorschot et al. | 380/30 |
| 5,745,574 A | 4/1998 | Muftic | |
| 5,797,128 A * | 8/1998 | Birnbaum | 707/5 |
| 5,828,832 A | 10/1998 | Holden et al. | |
| 5,903,652 A * | 5/1999 | Mital | 705/78 |
| 5,987,611 A | 11/1999 | Freund | |
| 6,061,796 A | 5/2000 | Chen et al. | |

(Continued)

*Primary Examiner*—Kim Vu
*Assistant Examiner*—Beemnet W. Dada
(74) *Attorney, Agent, or Firm*—Vedder, Price, Kaufman & Kammholz, P.C.

(57) ABSTRACT

A computer network security system and method utilizes digitally signed and centrally assigned policy data, such as password length rules, that is unilaterally enforced at network nodes by node policy enforcement engines. The policy data may be variable on a per client or network node basis through a centralized authority, such as a certification authority. The computer network security system provides variable security policy rule data for distribution to at least one network node through a central security policy rule data distribution source, such as the certification authority. The central security policy rule data distribution source associates a digital signature to the variable security policy rule data to ensure the integrity of the policies in the system. Each network node uses a policy rule data engine and policy rule table to decode policy rule data and enforce the policy rules as selectively determined through the central authority.

25 Claims, 4 Drawing Sheets

U.S. PATENT DOCUMENTS 6,067,620 A    5/2000  Holden et al.
6,119,230 A *  9/2000  Carter .................. 713/200

6,158,007 A *  12/2000 Moreh et al. ............... 713/201

* cited by examiner

COMPUTER NETWORK SECURITY SYSTEM AND METHOD HAVING UNILATERAL ENFORCEABLE SECURITY POLICY PROVISION

CROSS REFERENCE TO RELATED APPLICATION

This is a continuation of application entitled "Computer Network Security System and Method Having Unilateral Enforceable Security Policy Provision," having Ser. No. 08/986,457, filed Dec. 8, 1997 now U.S. Pat. No. 6,202,157, having inventors Brownlie et al., owned by instant Assignee.

BACKGROUND OF THE INVENTION

The invention relates generally to computer network security systems and more particularly to computer network security systems and methods having enforceable policy provisions.

Computer network security systems such as those employing public key cryptography techniques to encrypt and decrypt data, typically use a certification authority, such as a network server, to generate certificates that are used by network nodes to verify, among other things, that other communications sent by users are valid. Computer network security systems are known which allow network nodes to have several software applications that use the same security enforcement rules by having a cryptographic application which is accessible by each of the applications. For example, an E-mail application may access the cryptographic engine to encrypt E-mail messages. Likewise a financial document generation application may also allow access to the cryptographic engine to encrypt financial documents that may be transferred over communication links.

Conventional systems typically hard code security policy rules in the network nodes so that a node requires upgraded software each time a security officer changes a policy rule. Some global policies include for example a lifetime of a password, whether or not passwords can be reused, password length, the type of cryptographic keys allowable for a particular node and other policies. Hard-coded policy rules become cumbersome and can be costly to change in large systems. Moreover, such systems do not typically allow differing policies to be set for differing nodes or for differing environments, such as corporate email systems run on several servers and nodes in various organizations.

Some systems allow non-hard coded policy provisions to be used, but such systems do not typically allow the policy provisions to be definable through a centralized authority. It is desirable to have central control to institute policies to facilitate a more controlled environment particularly where a compromised communication can cause great damage to members of the network.

However, it is also desirable to provide policy flexibility in instances where policy rules need to be changed on a per application and/or per node basis. For example, where a node is used by a temporary employee or where the node is used by a user requiring a very high level security or high-security application, differing lengths of passwords or password life times may be necessary for each of the independent network nodes or applications.

Some systems employ attribute certificates to allow specification of information (attributes) other than public keys (but related to a certificate issuing authority, entity or public key), so that it is conveyed in a trusted manner to a relying party. Attribute certificates are conventionally associated with a specific signature public key by binding the attribute information to the key by the method by which the key is identified. For example the binding may be by the serial number of a corresponding public key certificate, or to a hash-value of the public key or certificate.

Typically, attributes may be signed by an attribute certificate authority, created in conjunction with an attribute registration authority, and distributed in conjunction with an attribute directory service. More generally, any party with a signature key and appropriate recognizable authority may create an attribute certificate. Typically, such attribute certificates are associated with a signature public key and forwarded by a party with a signed message to a relying party that verifies the signature on the received message and uses the attribute certificate to verify proper authority associated with the signature key. One known application is to certify authorization or privilege information related to a public key. More specifically, this may be used, for example, to limit liability resulting from a digital signature, or to constrain the use of a public key (e.g., to transactions of limited values, certain types, or during certain hours). However, such methods can unnecessarily increase system overhead and complexity since the attribute certificates are generally associated with a public key and must be verified by a relying party before a privilege is honored.

Consequently there exists a need for a computer network security system and method having enforceable security policy provisions that allows flexibility from a centralized authority to ensure more consistent control and implementation of the policies while offering flexibility to change policies when needed. Such a system should also allow enforcement of the policies to occur at the network nodes to help reduce overhead requirements of a central authority.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

Accordingly, a computer network security system and method utilizes authenticated, and centrally assigned security policy data, such as password length limits and lifetime limits (e.g., for passwords and certificates), that is unilaterally enforced at network nodes by node policy enforcement engines. A computer stores variable policy data for use by a network node and securely provides the variable security policy rule data, such as in the form of a policy certificate or data stream, for distribution to at least one network node to facilitate unilateral security policy enforcement at a network node level. Generally, the policy certificate and hence the variable policy rule data is used by a designated application or node and not forwarded with a signed message to a relying party, and need not be presented to a relying party since the variable policy data is used by designated applications or computer nodes and is not relied upon by any other application or node.

In one embodiment, the policy data is variable on a per client (network node basis) or per application basis for distribution to a plurality of network nodes through a central security policy rule data distribution source, such as the certification authority. The central security policy rule data distribution source associates a digital signature to the variable security policy rule data to ensure integrity of policies in the system. The digital signature and variable policy rule data may be stored in a public directory which is accessible by the network nodes. Each network node obtains the digital signature and variable policy rule data and analyzes the variable policy rule data to facilitate unilateral security policy enforcement at a network node level. Each network node uses a policy rule data engine and policy rule table to decode policy rule data and unilaterally enforce the policy rules as selectively determined through the central authority. A digital signature may be any direct or indirect manifestation of commitment or authentication on the part of an application or computer.

Figure 1:
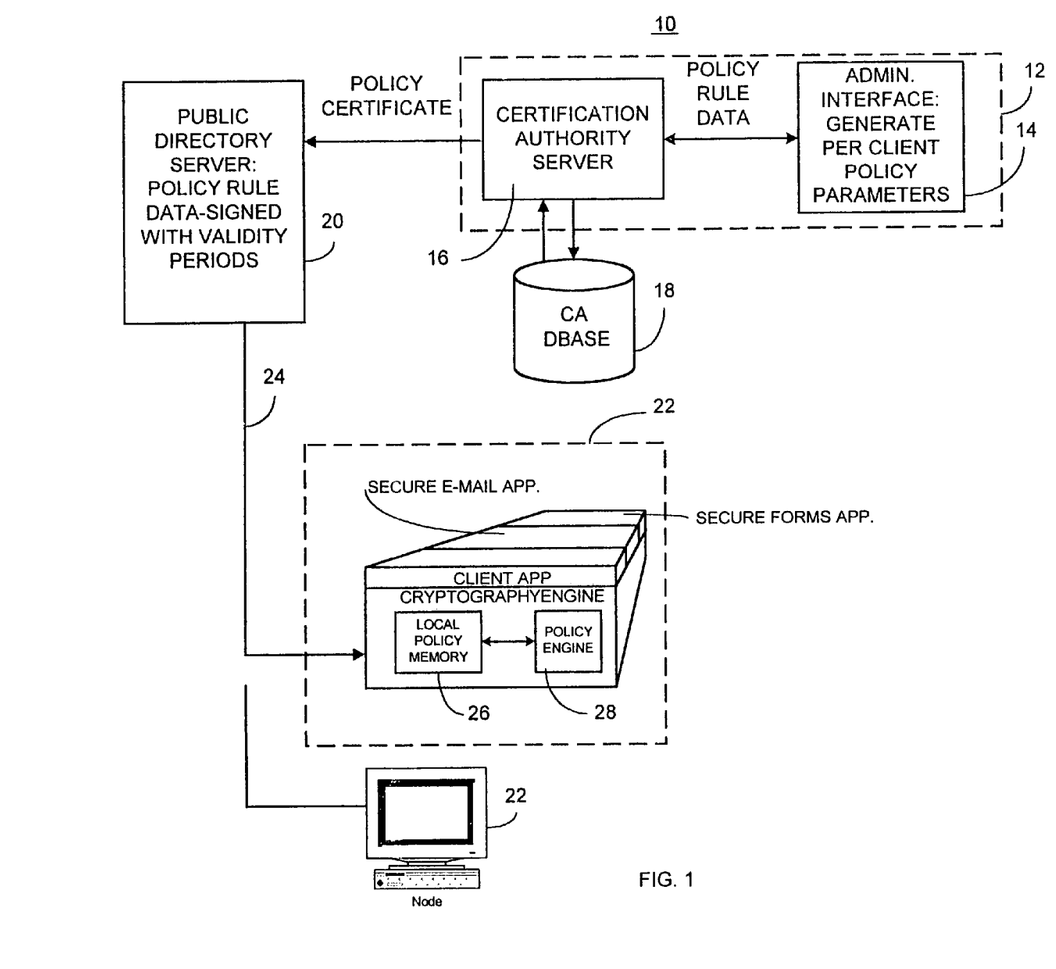
FIG. 1 is a block diagram generally depicting one embodiment of the invention.

FIG. 1 shows one embodiment of a computer network security system 10 having enforceable security policy provision. The system 10 includes a central server 12 which provides variable security policy rule data that may be selected through an administrator interface 14 such as a graphical user interface with graphic buttons for selecting various policy parameters. Policy rule data or policy parameters preferably relate to security policies that should be enforced by each network node (or client) in the networked computer system. Examples of policy parameters may include password policies relating to password aging, password reuse, length of password, allowed cryptographic algorithms, allowed cryptographic key lengths, lifetime rules related to certificates and certificate renewals, rules regarding importing public keys and public key certificates into trusted storage locations, whether certificate revocation list (CRL) storing is on or off, how long certificate revocation lists may be locally stored and other desired security policy parameters. If CRL storing is used, CRL generation and storing may be performed as described in co-pending application entitled "Computer Security System and Method With On-Demand Publishing of Certificate Revocation Lists" filed on even date and owned by instant assignee. However, it will be recognized by one of ordinary skill in the art that any other suitable method may also be used.

The central server 12 may be any suitable network server and preferably, but not by way of limitation, is programmed to act as a security management server or certification authority to issue certificates for public key cryptography security systems. Hence the central server 12 includes a certification authority server 16 that receives the variable security policy rule data from the administrator interface 14 including from data files or other storage media, for example allowing bulk-loading of per node security policy rules. The certification authority server 16 optionally associates a digital signature to the variable security policy rule data after it is entered for any given network node. The certification authority server 16 serves as the central security policy rule data distribution source. Alternatively, a central policy management node whose authority is recognized by network nodes, acts as the security policy rule distribution source. The certification authority server 16 stores the associated digital signature and corresponding variable policy rule data as a policy certificate in the certification authority secured data base 18. Alternatively, if no interface is used, the certification authority server 16 provides the variable security policy rule data from a data file, such as a file on a diskette or in another directory, containing the policy rule data.

The system 10 also includes a public directory 20 for storing the digital signature and variable policy rule data in the form of the policy certificate. The contents of the policy certificate include for example, signature data from the certification authority indicating that the policy certificate was generated by a trusted certificate authority, validity period data indicating the duration of the policy certificate, the variable policy rule data or a representation thereof and any other desired data.

The system 10 also includes a plurality of network nodes 22 that have access to the public directory 20 through a network link 24. Each network node 22 obtains the digital signature and variable policy rule data in the form of the policy certificate from the public directory server 20 and analyzes the variable public rule data to facilitate unilateral security policy update and enforcement at a network node level as further described below. Alternatively, data could be transferred to the node 22 by store and forward or other method periodically, including for example by off-line methods such as decoupled storage devices like CD-ROMS, diskettes or other devices. Each network node preferably includes a cryptography engine, such as an RSA based public key cryptography engine to decode encrypted data and send encrypted data to other nodes in the network as known in the art. The cryptography engine facilitates cryptographic processing of data that is accessible by a plurality of software applications supported by the node 22. For example, a client application may be a software program for controlling the network node 22 to perform operations such as retrieving certificates, encrypting messages to be sent and decrypting messages that are received, digitally signing messages to establish data origin authenticity, and verifying received digital signatures. Other applications may include by way of example, a secured E-mail application which encrypts E-mails that are sent and decrypts E-mails that are received. In addition another software application may include a secure document application such as a financial document generation program that uses the cryptography engine to digitally sign financial documents and verify the digital signature on received financial documents. Each application may have different policy rule data in corresponding policy certificates or corresponding local data stores (where policy certificates are not used) to facilitate policy customization in a per application basis.

Each network node 22 also includes local policy rule data memory 26 for storing variable policy rule data obtained from public directory 20. A policy engine 28 stores prestored policy rule analysis data to decode the variable policy rule data received from the public directory 20 or policy memory 26. The policy engine 28 uses the policy rule analysis data to facilitate unilateral security policy enforcement once the variable policy rule data has been decoded. Hence no other relying party is used. The security policy enforcement is done solely by the node.

Figure 2:
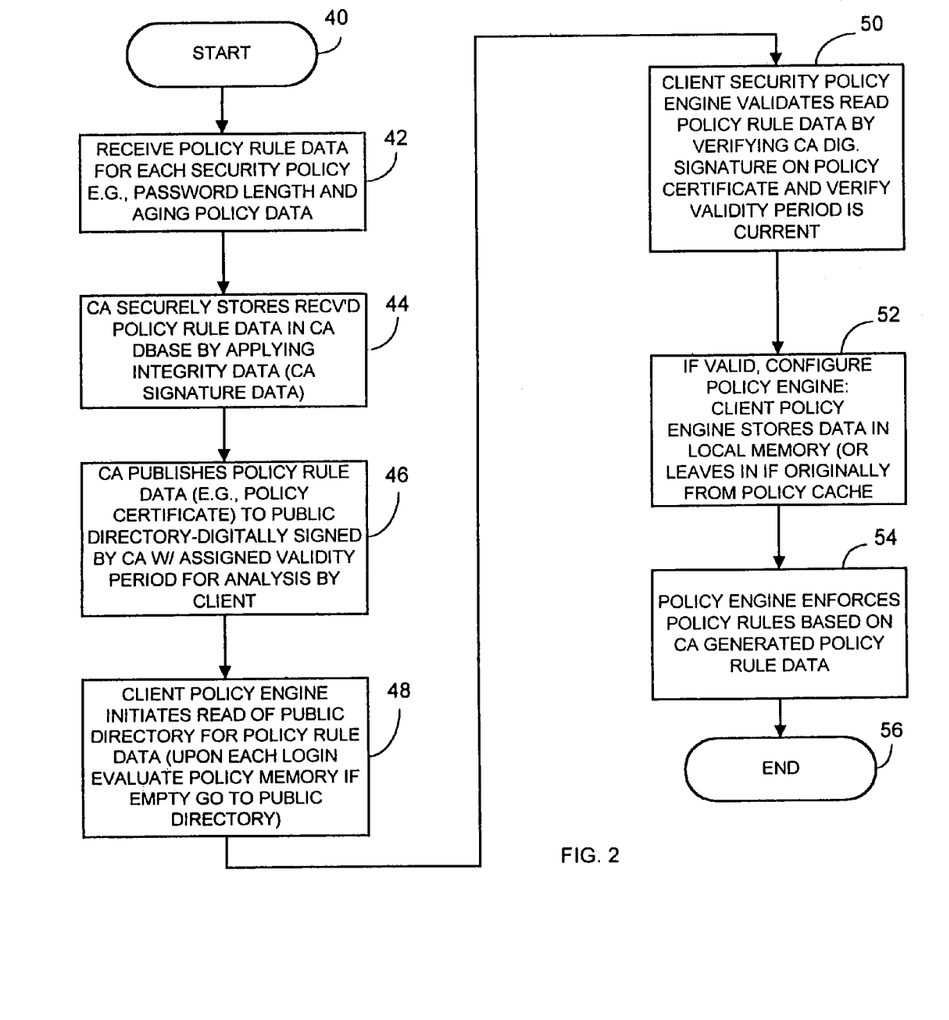
FIG. 2 is a flowchart generally indicating the operation of one embodiment of the invention.

FIG. 2 shows one embodiment of the operation of the system 10 wherein the system starts in block 40 by prompting a security officer to select variable security policy rule data (see e.g., FIG. 4) through graphical user interface 14. For purposes of illustration, operation will be described with reference to a system employing policy certificates, but the operation also applies to policy rule data contained in other forms. The central server 12 then receives the policy rule data for each security policy for each network node. The variable security policy rule data is then used for policy definition for the network nodes on a per application and/or per node basis by the certification authority server 16. This is shown in block 42. The certification authority server 16 securely stores the received policy rule data in the certification authority database 18 by applying integrity data to the variable policy rule data. Integrity data as known in the art may include certification authority digital signature data. This is shown in block 44. The digital signature data may be a digital signature with assigned validity period for analysis by the network nodes 22. To create a policy certificate, the received variable policy rule data is associated with a digital signature and assigned validity periods and other suitable data, and the information is stored as a policy certificate in the certification authority database 18. The certification authority server 16 publishes the variable policy rule data (i.e., the policy certificate) to the public directory 20. This is shown in block 46.

In block 48, the network node policy engine 28 initiates a read of the public directory 20 to obtain the variable policy rule data for the given network node 22. This preferably occurs upon each log-in of the network node 22. However, this can occur at any suitable time and may be based on the policy rule data.

The client policy engine 28 evaluates the policy rule memory 26 to see if the policy memory 26 is empty or otherwise indicates that new policy rule data should be retrieved. If the policy memory is empty the policy engine then reads from the public directory, otherwise the policy engine 28 evaluates the policy certificates or locally stored policy rule data in the policy memory store 26. The network node security policy engine 28 validates the read policy rule data or locally stored policy rule data by verifying the certification authority digital signature on the policy certificate or otherwise verifies integrity of locally stored policy rule data and optionally, if present, verifies that the validity period of the policy certificate is current as shown in block 50.

If the policy certificate is valid, the policy engine 28 configures itself. In other words the client policy engine 28 stores the variable policy rule data from the public directory in memory or leaves it in the memory if it was originally obtained from the policy memory store 26 as shown in block 52. The security policy engine 28 of the node enforces the policy rules based on the certification authority generated variable policy rule data as shown in block 54. For example, if the variable policy rule data defined a policy that required a password length of sixteen random characters, the security policy engine cross references a policy codebook and enforces the policy corresponding to the variable policy rule data. The network node will then wait until a new log-on occurs before evaluating another policy certificate in its policy memory 26 or in the public directory 20 as shown in block 56. In an alternative embodiment, the database 18 stores a policy certificate for distribution to the network nodes 22 under control of the certification authority server and the public directory may be optionally eliminated. In this embodiment, the server 16 pushes the policy certificate out to the nodes based on policy delivery data stored in the policy certificate as selected by a security officer. This "push" approach adds more overhead requirement to the server 16 as opposed to the "pull" approach used when network nodes initiate retrieval of the policy certificates.

Figure 3:
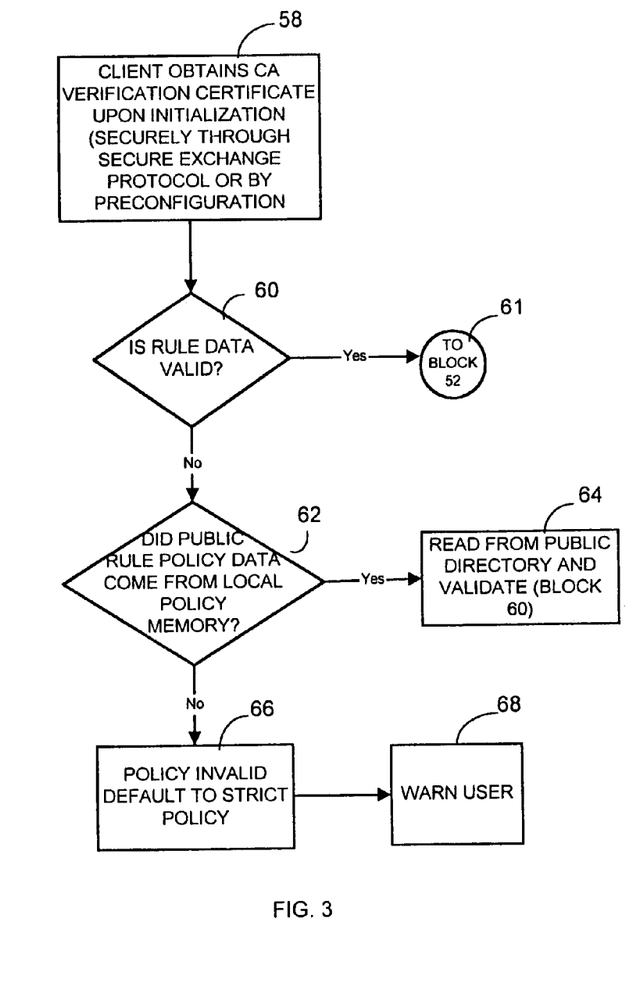
FIG. 3 is a flowchart generally depicting in more detail a step shown in FIG. 2.

FIG. 3 shows in more detail the steps within block 50 of FIG. 2. As shown, in block 58, the client or network node 22 possesses the certification authority verification certificate to verify the policy certificate. The certification authority verification certificate is obtained upon initialization securely, for example using a secure exchange protocol as known in the art, such as PKIX Certificate Management Protocol, or otherwise initialized into the network node by pre-configuration. The policy engine 28 analyzes the policy certificate obtained from public directory 20 or policy memory 26 to see if the variable policy rule data is valid by verifying the signature and, if present, evaluating the validity period data as shown in block 60. If the policy rule data is valid, the system proceeds back to block 52 as shown in block 61. If however the variable policy rule data is not valid, the policy engine 28 determines whether the policy rule data came from the policy memory store 26 or from the public directory server 20 as shown in block 62. If the policy rule data came from the policy memory store 26, the policy engine 28 initiates a read from the public directory 20 and validates the policy rule data (back to block 60) as shown in block 64. If the invalid public policy rule data did not come from the memory, the variable policy rule data is determined to be invalid as shown in block 66. The policy engine 28 then defaults to another priority level of policy, namely the strictest policy level to ensure that security is not compromised. Alternatively, the absence of valid policy data causes the cryptographic engine to shut down or cease further cryptographic processing. For example, if the variable policy rule data set a limit of password length less than a maximum length as pre-stored in the node, the node defaults to the maximum password length to avoid security compromise. The policy engine 28 then sends a command to warn a user of the node 22 as shown in block 68.

Figures 4, 5:
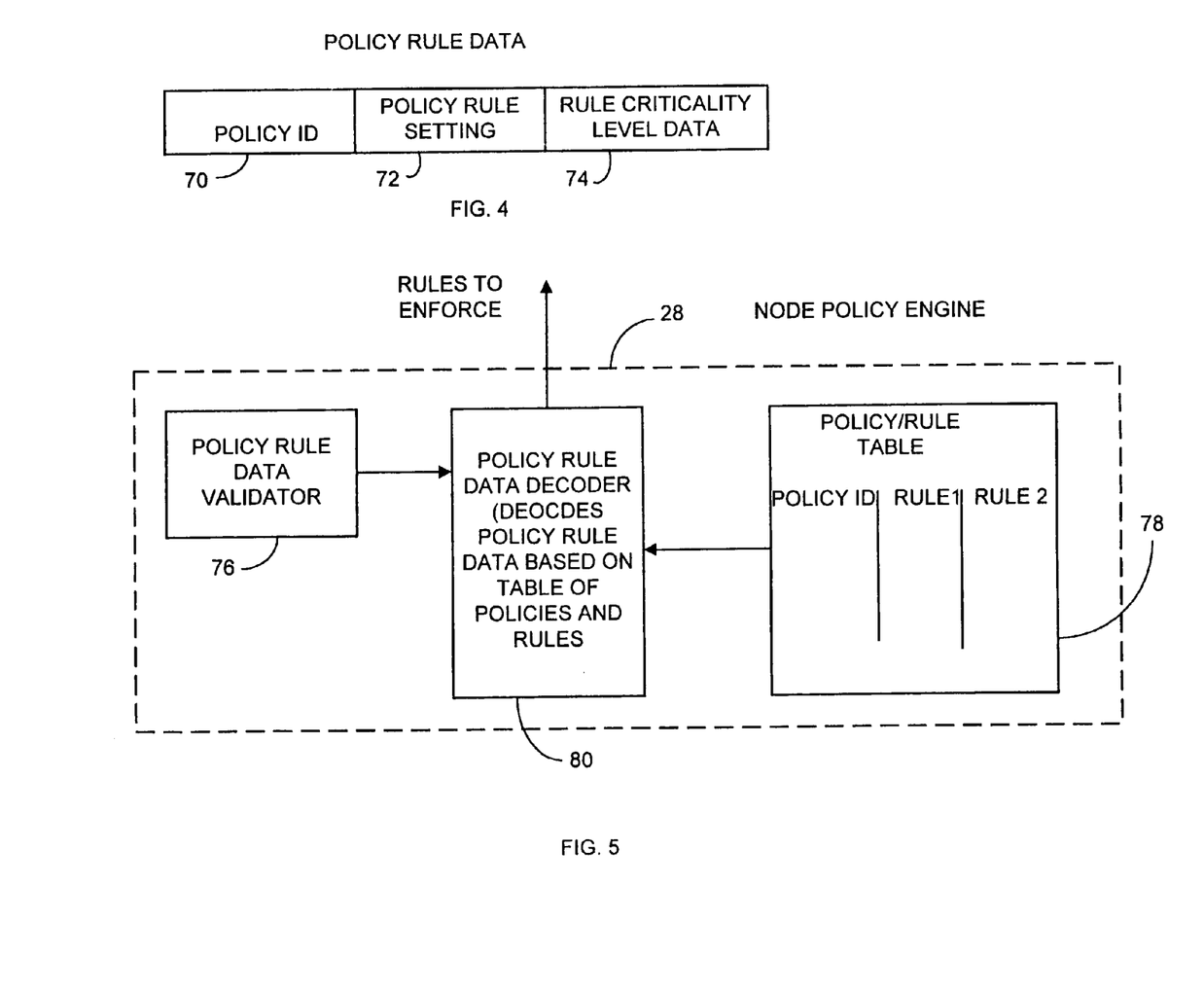
FIG. 4 is a block diagram generally depicting content of policy rule data in accordance with one embodiment of the invention.
FIG. 5 is a block diagram generally depicting a client policy engine in accordance with one embodiment of the invention.

FIG. 4 shows an example of variable policy rule data which may include security policy identification data 70, policy rule setting data 72 and policy rule prioritization data 74. The policy identification data 70 may be, for example, a numerical value representing the policy associated with the general category of passwords. Corresponding policy rule setting data 72 may be, for example, that the password length is a minimum of twelve characters. The policy rule prioritization data 74 may be numerical data indicating the level of priority that the policy rule setting data and policy I.D. should obtain in the event that an overriding or underriding policy I.D. is subsequently published. This data is decoded by the policy engine 28. By using such numerical identifiers, less data needs to be sent and published through the public directory 20. However, it will be recognized that any suitable data may be used, including data that is readily understood by network node, so that no decoding is necessary. The software cryptographic engine controls the network node, therefore, to periodically obtain the variable policy rule data from the central security policy rule data distribution source and to analyze the variable policy rule data to facilitate security policy enforcement at a network node level based on the variable policy rule data.

FIG. 5 shows a block diagram of one example of the client policy engine 28 having a policy rule data validator 76 which is a software program that causes the node to perform the function of determining whether a policy certificate is valid such as previously described with reference to FIG. 2. The client policy engine 28 also includes policy table data/policy rule analysis data 78 which is prestored cross reference data that identifies policy rules associated with given policy identification data 70. For example, for a given policy I.D. 70, such as the category of password, several rules may apply based on the policy rule setting data 72. The policy rule table 78 stores the rules (Rule 1, Rule 2 . . . ) that must be carried out by the network node based on the policy rule setting data 72. By way of example, for a policy ID associated with password rules, the following rules may all have to be satisfied: Rule 1—the password must be greater than twelve characters in length; Rule 2—the password must contain at least one upper case alpha character; Rule 3—the password must contain at least one lower case alpha character; and Rule 4—the password must contain at least one numeric character. A policy rule data decoder 80 receives the variable policy rule data from the policy memory store 26 or public directory 20 and decodes the policy rule data using the policy rule table information 78. Once the policy rule setting information has been determined, the client policy engine 28 then determines the rules to enforce and prevents the network node 24 from performing unauthorized actions.

For example if the centralized certification authority server 16 has received variable policy rule data through the interface 14 which restricts a life of passwords to two months for a given node, the node 22 having received its particular variable policy rule data that was published in the public directory 20, then restricts a user of the network node 22 from continuing to use a password once the two month period had expired. Hence the policies are under central control but they are enforced at the client by the client policy engine. The variable security policy rule data is only distributed to or obtained by the nodes (and/or corresponding applications) that can enforce the rules identified by the policy identification data. The variable policy rule data is therefore preferably not presented to or used by any other parties in the system. It will also be recognized that although policy rule table 78 is used, any suitable policy determination cross reference may be used to decode the policy rule data if necessary.

The client policy engine is preferably, but not by way of limitation, a software module written to control the node computer to perform the functions as previously described. Likewise, the functions of the certification authority and interface 14 are also software modules that are designed to control any suitable network server to perform functions as indicated above.

Also, having policy rule data associated on a per application basis allows different policies to be enforced depending on the application requesting the cryptographic service or engine. In this case, security applications identify the application upon first calling (or each calling) of the cryptographic service. More particularly, policy ID data 70 in FIG. 4 would include additional information representing the identity of the application for which the policy rule setting applies.

In an alternative embodiment, network node specific policies may be distributed to nodes via initialization messages with periodic updates from the certification authority 16, for example via secure online message updates or store-and-forward secured messages. In this case, the public directory need not necessarily be used to publish the policy certificates. Furthermore, the policy rule data may, but need not necessarily be housed within a policy certificate. As a minimum, the policy data itself must be securely transferred to the network node and stored there locally in a trusted environment. A preferred method of accomplishing this transfer at periodic intervals would be to transfer the data using a secure exchange protocol such as an information message as specified in the Internet Engineering Task Force (IETF) PKIX Certificate Management Protocol (formerly known as PKIX-3).

For example, in an alternative embodiment, the computer network security system may have enforceable security policy provision by storing and securely sending an unsigned string of variable policy rule data for use by a network node. In this embodiment, the unsigned string of variable policy rule data may be stored in a database or remote data file and is securely provided for distribution to a plurality of network nodes to facilitate unilateral security policy enforcement at a network node level by sending the unsigned policy rule data over a secure channel. The secure channel may be an encrypted session pipe or in a signed e-mail message but the digital signature is for multiple policy rule data strings rather than a separate signature for each policy data item. Once the policy rule data is received by the network node application, the data is used to fill the policy rule/data memory for the network node. The secure session may be, for example a secure sockets layer (SSL) or Simple Public Key Mechanism (SPKM, internet RFC 2025) type session. If desired, the computer for providing the unsigned policy rule data strings may include a user interface to facilitate selection of variable security policy rule data through pull down menus or other suitable mechanism. The user interface is similar to that described above. Through the user interface, the computer facilitates selection of variable security policy rule data on a per network node basis for central policy definition for the plurality of network nodes.

With the disclosed publication of the policy certificate by the certification authority, the entire user community of network nodes has policy items that are distributed by central authority. This facilitates control by a security officer or other administrative entity. The variable policy rule data may be selected to be any suitable range within given parameters and hence allows selectivity and variability by a system administrator. For example, a system administrator may select which cryptographic algorithms may used by given network nodes and may be provided with a list through graphical user interface 14 to select which cryptographic algorithm should be used for a given network node. This policy rule data is then put in the format as shown FIG. 4 by the certification authority server 16 and published in the public directory 20 as an policy certificate after being digitally signed and authenticated by the certification authority.

It should be understood that the implementation of other variations and modifications of the invention in its various aspects will be apparent to those of ordinary skill in the art, and that the invention is not limited by the specific embodiments described. For example, the certification database 18 and the public directory may be the same database or a separate entity may provide such services. Other variations may include for example, the use of a single policy certificate by more than one network node, so that a group of nodes would each use a copy of the same policy certificate, or policy data string if certificates are not used, to define their own security policy rules as a common security policy for a group.

Moreover, where policy certificates are used, the system may allow the authority that signs the policy certificate to be different than the certification authority with which the network node is associated. It is therefore contemplated to cover by the present invention, any and all modifications, variations, or equivalents that fall within the spirit and scope of the basic underlying principles disclosed and claimed herein.

What is claimed is:

1. A computer network security system having enforceable security policy provision comprising:
    means for providing variable security policy rule data for distribution to at least one network node;
    means, operatively coupled to the means for providing, for associating a digital signature of a central security policy rule data distribution source to the variable security policy rule data;
    means for storing the digital signature and the variable policy rule data; and
    network node means; operatively coupled to the storage means, for periodically obtaining the digital signature and the variable policy rule data from the means for storing, and not from a forwarded signed message, and for analyzing the variable policy rule data to facilitate unilateral security policy enforcement at a network node level.

2. The computer network system of claim 1 wherein the means for providing includes user interface means for facilitating selection of variable security policy rule data.

3. The computer network system of claim 1 wherein the means for providing provides the variable security policy rule data from a data file.

4. The computer network system of claim 1 wherein the means for providing variable security policy rule data facilitates selection of variable security policy rule data on a per network node basis for central policy definition for the at least one network node.

5. The computer network system of claim 1 wherein the means for associating a digital signature of a central security policy rule data distribution source includes means for associating a digital signature to the variable policy rule data to create a policy certificate.

6. The computer network system of claim 1 wherein the network node means includes:
    means for storing variable policy rule data; and
    means, operatively coupled to the means for storing, for using policy rule analysis data to decode the variable policy rule data to facilitate security policy enforcement at a network node level.

7. The computer network system of claim 1 wherein the variable policy rule data includes at least security policy identification data and policy rule setting data.

8. The computer network system of claim 7 wherein the variable policy rule data includes policy rule prioritization data.

9. The computer network system of claim 1 wherein the variable policy rule data includes policy rule data on a per application basis for a plurality of software applications supported by at least one network node.

10. The computer network system of claim 1 wherein the means for storing the digital signature and the variable policy rule data stores a policy certificate for distribution to the network node under control of the network node.

11. The computer network system of claim 1 wherein the means for storing the digital signature and the variable policy rule data stores a policy certificate for distribution to the network nodes under control of the means for associating.

12. A method for providing enforceable security policy provisions comprising:
    providing variable security policy rule data for distribution to at least one network node;
    associating a digital signature of a central security policy rule data distribution source to the variable security policy rule data;
    storing the digital signature and the variable policy rule data; and
    periodically obtaining the digital signature and the variable policy rule data, not forwarded with a signed message, and analyzing the variable policy rule data to facilitate unilateral security policy enforcement.

13. The method of claim 12, wherein the step of providing variable security policy rule data includes facilitating selection of variable security policy rule data.

14. The method of claim 12, wherein providing variable security policy rule data includes facilitating selection of variable security policy rule data on a per network node basis for policy definition for at least one network node.

15. The method of claim 12, wherein associating a digital signature of a central security policy rule distribution source includes associating a digital signature to the variable policy rule data to create a policy certificate.

16. The method of claim 12, wherein the step of obtaining the digital signature and the variable policy rule data includes:
    storing variable policy rule data;
    storing policy rule analysis data for evaluating the policy rule data; and
    using the policy rule analysis data to decode the variable policy rule data to facilitate unilateral security policy enforcement at a network node level.

17. The method of claim 12, wherein the variable policy rule data includes at least security policy identification data, policy rule setting data and policy rule prioritization data.

18. The method of claim 12 wherein the variable policy rule data includes differing policy rule data for a plurality of software applications supported by at least one network node and wherein the at least one network node includes means for facilitating cryptographic processing of data that is accessible by the plurality of software applications.

19. The method of claim 12, wherein storing the digital signature and the variable policy rule data includes storing a policy certificate for distribution to the network nodes under control of the network nodes.

20. The method of claim 12, wherein storing the digital signature and the variable policy rule data includes storing a policy certificate for distribution to the network nodes under control of a network server.

21. The system of claim 1 wherein the central security policy rule data distribution source is a certification authority.

22. The system of claim 1 wherein the variable policy rule data includes policy rule data on a per node basis.

23. A computer having enforceable security policy provision comprising:
    means for securely obtaining variable policy rule data from a central security policy rule data distribution source and not from a forwarded signed message;
    means, operatively coupled to the means for obtaining, for analyzing the variable policy rule data;
    means, responsive to the means for analyzing the variable policy rule data, for facilitating unilateral security policy enforcement at a network node level based on the variable policy rule data; and
    wherein the variable policy rule data includes differing policy rule data for a plurality of software applications supported by the computer and wherein the computer includes means for facilitating cryptographic processing of data that is accessible by the plurality of software applications.

24. A computer having enforceable security policy provision comprising:

means for securely obtaining variable policy rule data from a central security policy rule data distribution source and not from a forwarded signed message;

means, operatively coupled to the means for obtaining, for analyzing the variable policy rule data;

means responsive to the means for analyzing the variable policy rule data, for facilitating unilateral security policy enforcement at a network node level based on the variable policy rule data; and     wherein the variable policy rule data includes policy rule prioritization data and wherein the means for periodically obtaining obtains a digital signature corresponding to the policy rule data.

25. A storage medium for storing programming instructions that, when read by a processing unit, causes the processing unit to provide enforceable security policy provision, the storage medium comprising:

first means for storing programming instructions that facilitate storing variable security policy rule data for use by a network node;

second means for storing programming instructions that facilitate providing the variable security policy rule data for distribution to at least one network node other than through a forwarded signed message to facilitate unilateral security policy enforcement at a network node level; and     wherein the first means for storing programming instructions stores programming instructions that, when read by a processing unit, causes the processing unit to associate a digital signature to a policy rule data to create a policy certificate.

\* \* \* \* \*